UNITED STATES PATENT OFFICE.

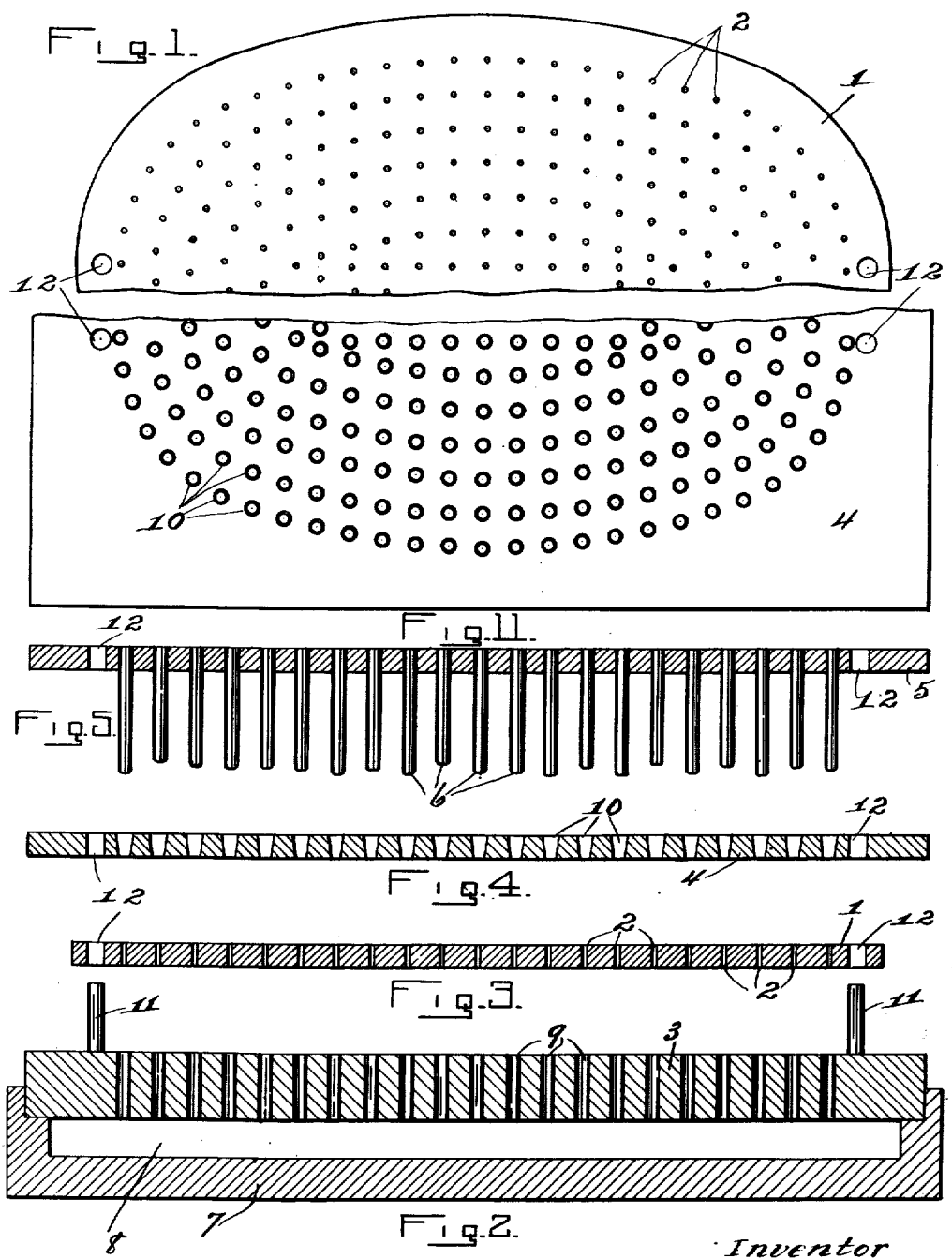

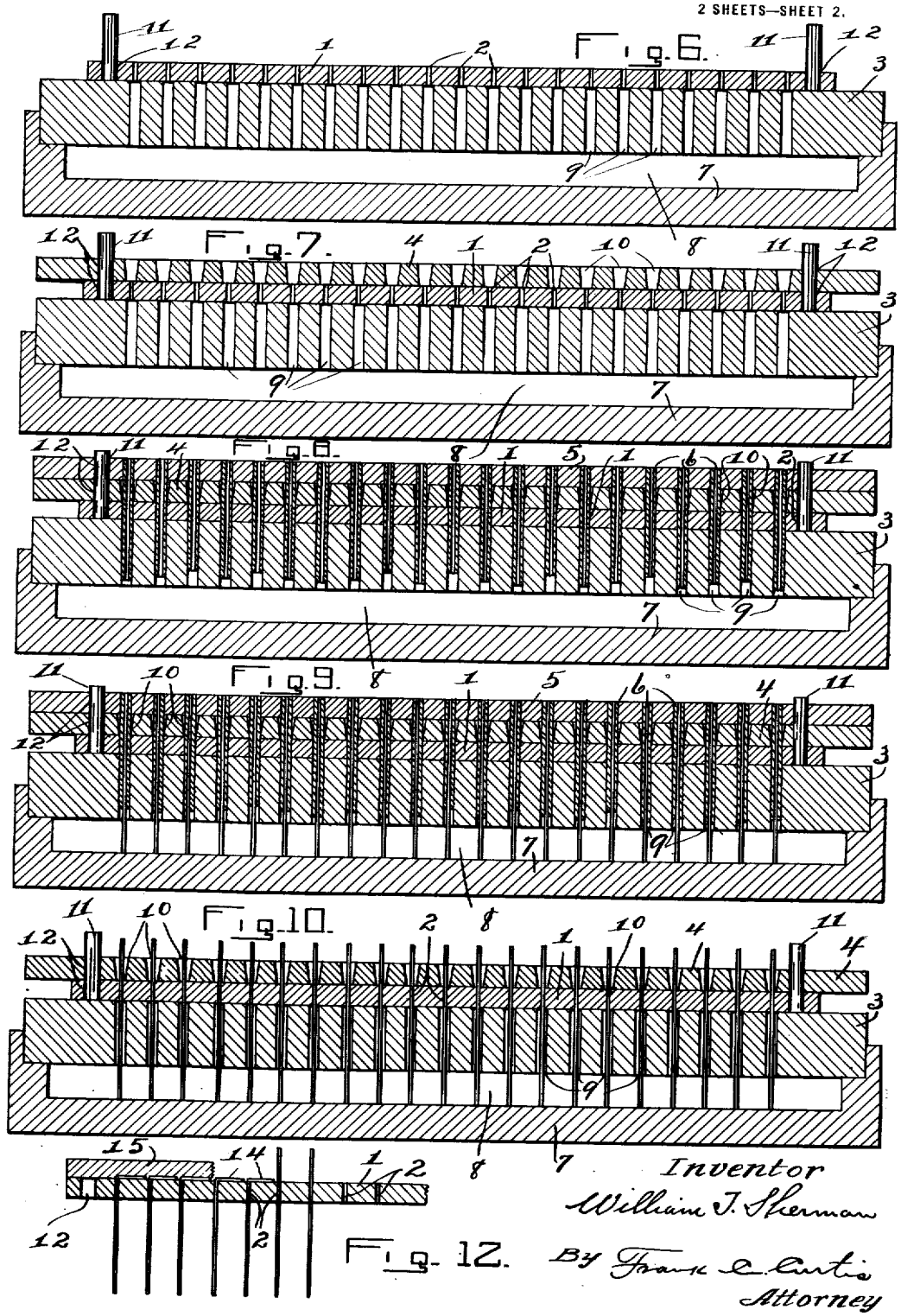

WILLIAM T. SHERMAN, OF TROY, NEW YORK, ASSIGNOR TO HENRY T. HUGHES CO. INC., OF NEW YORK, N. Y., A CORPORATION OF NEW YORK.

APPARATUS FOR INSERTING BRISTLES IN RUBBER PADS.

1,355,278.  Specification of Letters Patent.  Patented Oct. 12, 1920.

Original application filed November 13, 1916, Serial No. 130,953. Divided and this application filed October 23, 1919. Serial No. 332,718.

*To all whom it may concern:*

Be it known that I, WILLIAM T. SHERMAN, a citizen of the United States, residing at Troy, county of Rensselaer, and State of New York, have invented new and useful improvements in Apparatus for Inserting Bristles in Rubber Pads, of which the following is a specification.

Reference may be had to the accompanying drawings, and the reference characters marked thereon, which form a part of this specification. Similar characters refer to similar parts in the several figures therein.

This application is a division of an application filed by me November 13, 1916, Serial No. 130,953, for improvements in inserting bristles in rubber pads.

This invention relates to the manufacture of bristle-supporting rubber pads suitable for use in hair brushes and the like.

In such pads the bristles are inserted separately or in groups of two or more through small apertures in the pad, the inner ends of the bristles being provided with heads or offsets which are covered in some suitable manner with a backing-sheet, whereby the bristles are permanently mounted in the rubber pad.

The present invention relates more particularly to inserting the bristles through the apertures in the rubber pad.

The principal object of the invention is to simplify and cheapen the operation of inserting the bristles in the apertures in the rubber pad.

Other objects will appear in connection with the following description.

Figure 1 of the drawings is a plan view of one of the rubber pads perforated preparatory to having the bristles inserted therein.

Fig. 2 is a vertical cross-section of the lower clamp-plate resting upon a suitable support.

Fig. 3 is a similar section of the rubber pad shown in Fig. 1.

Fig. 4 is a similar section of the upper clamp-plate.

Fig. 5 is a similar section of the plate carrying the bristle-guiding tubes.

Fig. 6 is a similar section showing the rubber pad applied to the lower clamp-plate, shown in Fig. 2.

Fig. 7 is a similar section showing the upper clamp-plate superimposed upon the rubber pad, as shown in Fig. 6.

Fig. 8 is a similar section showing the plate having the bristle-guiding tubes superimposed upon the upper clamp-plate, as shown in Fig. 7, with the respective tubes inserted through the flaring apertures in the upper clamp-plate, and the apertures in the pad, into the corresponding openings in the lower clamp-plate.

Fig. 9 is a view similar to Fig. 8, showing the bristles inserted through the tubes.

Fig. 10 is a similar section with the bristle-guiding tubes withdrawn leaving the bristles inserted in the apertures in the rubber pad.

Fig. 11 is a plan view of the upper clamp-plate.

Fig. 12 is a view in cross-section of the rubber pad after the bristles have been inserted in the apertures in the pad.

Referring to the drawings wherein the invention is shown in preferred form, 1 is a pad of soft vulcanized rubber or the like, provided with a series of perforations, 2, each adapted to receive and closely fit a single bristle or a group of two or more bristles as may be desired.

My improved apparatus for inserting bristles in the apertures, 2, in the pad, 1, comprises a lower clamp-plate, 3, an upper clamp-plate, 4, and a plate, 5, carrying a series of bristle-guiding tubes, 6.

The lower clamp-plate, 3, is adapted to rest upon a suitable support, 7, leaving beneath the clamp-plate a free space, 8, into which the lower ends of the bristles may extend. This lower clamp-plate is provided with a series of openings, 9, corresponding in number and location with the perforate openings, 2, in the rubber pad, 1.

The upper clamp-plate, 4, is provided with a series of perforations, 10, corresponding in number and location with the openings, 9, in the lower clamp-plate and the perforations, 2, in the rubber pad.

The plate, 5, carries a series of bristle-guiding tubes, 6, corresponding in number and location with the openings, 9, in the lower clamp-plate, apertures, 2, in the rubber pad, and apertures, 10, in the upper clamp-plate.

The apertures, 10, in the upper clamp-plate are preferably made to flare outwardly as shown, their outer ends being of a diameter to freely receive and guide the respective tubes, while their inner ends are of a diameter which closely fits the tubes.

The openings, 9, in the lower clamp-plate, 3, are of substantially the same diameter as the smaller ends of the apertures, 10, in the upper clamp-plate.

The apertures, 2, in the rubber pad are somewhat smaller in diameter than the tubes, 6; and the ends of the tubes, 6, may be slightly tapered or rounded to facilitate their passage through the apertures, 2, in the pad.

The manner in which the apparatus is used in inserting bristles in rubber pads is as follows:—

The rubber pad, 1, is superimposed upon the lower clamp-plate, 3, with the perforations, 2, of the pad in alinement with the respective openings, 9, in the lower clamp-plate, as shown in Fig. 6. The upper clamp-plate, 4, is then superimposed upon the rubber pad with the perforations, 10, of the upper clamp-plate in alinement with the respective perforations, 2, in the rubber pad, as shown in Fig. 7.

For convenience in alining the apertures and openings the lower clamp-plate, 3, is preferably provided with two or more upwardly projecting guide-pins, 11, and the rubber pad and the upper clamp-plate are provided with correspondingly located apertures, 12, adapted to receive the respective guide-pins, 11, whereby when the clamp-plates and pad are assembled, as shown in Figs. 7, 8 and 9, the apertures in the pad will be alined with the respective apertures in the upper clamp-plate and the respective openings in the lower clamp-plate.

After the rubber pad has been clamped between the clamp-plates, 3 and 4, as shown in Fig. 7, the plate, 5, is superimposed upon the upper clamp-plate, 4, with its tubes, 6, inserted through the respective flaring apertures, 10, in the upper clamp-plate, 4, and the respective apertures, 2, in the pad, into the respective openings, 9, in the lower clamp-plate, as shown in Figs. 8, 9 and 10.

In thus inserting the bristle-guiding tubes, 6, they are forced through the somewhat smaller apertures, 2, in the rubber pad, the yielding nature of the rubber permitting the apertures to temporarily enlarge sufficiently for this purpose. The ends of the tubes are of such size and form as to readily enter and expand the respective apertures, 2, for the purpose stated.

As the rubber pad offers more or less resistance to the passage of the tubes, 6, therethrough, I prefer to make the tubes of different lengths, so that they will enter the pad successively and not all at the same instant.

After the tubes, 6, have been inserted in the rubber pad in the manner above described, bristles are inserted through the respective tubes, 6, by hand or by suitable apparatus, each tube receiving a single bristle or a group of two or more bristles, as may be desired. The tubes protect the bristles from contact with the walls of the perforations, 2, in the rubber pad permitting the bristles to be inserted with practically no resistance.

After all of the tubes, 6, have been supplied with bristles the plate, 5, is removed, withdrawing the tubes, 6, and leaving the bristles inserted through the apertures, 2, in the rubber pad, as shown in Fig. 10. As the tubes are gradually withdrawn from the respective apertures, 2, in the rubber pad the elasticity of the rubber causes the apertures, 2, to contract and closely engage the respective bristles.

After the plate, 5, with its tubes, 6, has been removed, the upper clamp-plate, 4, is removed.

The bristles are of such length that when the upper clamp-plate, 4, is removed the upper ends of the bristles project a sufficient distance above the rubber pad to permit said ends to be bent over at right angles, as shown at 14, in Fig. 12, or otherwise headed, to prevent the bristles from being withdrawn downwardly through the pad.

After the bristles have been inserted in the pad in the manner above set forth, the pad may be completed in any known manner as by cementing or otherwise securing upon the back of the pad a flexible backing-sheet, 15, of fabric, rubber or the like, which covers the heads of the bristles and prevents the bristles from backing out through the apertures in the pad.

For certain purposes of the invention the guiding-plate, 4, may be omitted and the tubes, 6, may be forced directly through the apertures in the rubber pad, this being possible, due to the support afforded to the rubber pad by the plate, 3.

What I claim as new and desire to secure by Letters Patent is—

1. In combination, in an apparatus for inserting bristles in rubber pads, a pair of plates adapted to receive between them a rubber pad, one of said plates being provided with a perforation, and the other with an opening opposite said perforation, and a bristle-guiding tube removably insertible through said aperture in the one plate, and through a rubber pad interposed between the plates, into said opening in the other plate.

2. In combination, in an apparatus for inserting bristles in rubber pads, a pair of clamp-plates adapted to hold between them a rubber pad, one of said clamp-plates being provided with a series of perforations, and the other with openings opposite said respective perforations, and a third plate having a corresponding series of bristle-guiding tubes removably insertible through the respective apertures in the one clamp-plate, and through a rubber pad interposed between said clamp-plates into the said openings in the other clamp-plate.

3. In combination, in an apparatus for inserting bristles in rubber pads, a pair of clamp-plates adapted to hold between them a rubber pad, one of said plates being provided with a series of outwardly flaring perforations, and the other with openings opposite said respective perforations, and a third plate having a corresponding series of bristle-guiding tubes removably insertible through the respective flaring apertures in the one clamp-plate, and through a rubber pad interposed between the clamp-plates into the corresponding openings in the other clamp-plate.

In testimony whereof, I have hereunto set my hand this 20th day of October, 1919.

WM. T. SHERMAN.

Correction in Letters Patent No. 1,355,278.

It is hereby certified that the name of the assignee in Letters Patent No. 1,355,278, granted October 12, 1920, upon the application of William T. Sherman, of Troy, New York, for an improvement in "Apparatus for Inserting Bristles in Rubber Pads," was erroneously written and printed as "Henry T. Hughes Co. Inc.," whereas said name should have been written and printed as *Henry L. Hughes Co. Inc.*, as shown by the records of assignments in this office; and that the said Letters Patent should be read with this correction therein that the same may conform to the record of the case in the Patent Office.

Signed and sealed this 30th day of November, A. D., 1920.

[SEAL.]

L. B. MANN,
*Acting Commissioner of Patents.*

Cl. 15—7.